(12) United States Patent
Bruemmer et al.

(10) Patent No.: US 7,929,907 B2
(45) Date of Patent: Apr. 19, 2011

(54) TIMING RECOVERY SCHEME FOR SATELLITE BACKHAUL LINK

(75) Inventors: Kevin J. Bruemmer, Southington, CT (US); James M. Van Donsel, Waltham, MA (US); Pascal Chamberland, Candiac (CA)

(73) Assignee: Comtech EF Data, Inc., Tempe, AZ (US)

( * ) Notice: Subject to any disclaimer, the term of this patent is extended or adjusted under 35 U.S.C. 154(b) by 830 days.

(21) Appl. No.: 11/937,782

(22) Filed: Nov. 9, 2007

(65) Prior Publication Data
US 2009/0129310 A1    May 21, 2009

Related U.S. Application Data

(60) Provisional application No. 60/858,216, filed on Nov. 9, 2006.

(51) Int. Cl.
*H04B 7/19* (2006.01)
*H04B 7/00* (2006.01)

(52) U.S. Cl. ........ 455/13.2; 455/502; 455/503; 370/350

(58) Field of Classification Search .................. 455/13.2, 455/502, 503, 427, 12.1, 3.02; 370/509, 370/510, 503, 310, 324, 511, 512, 513, 514, 350

See application file for complete search history.

(56) References Cited

U.S. PATENT DOCUMENTS

| | | | | | |
|---|---|---|---|---|---|
| 5,261,118 | A | * | 11/1993 | Vanderspool et al. | ......... 455/503 |
| 6,323,804 | B1 | * | 11/2001 | Kurby et al. | ............. 342/357.64 |
| 6,625,463 | B1 | * | 9/2003 | Xiao et al. | ..................... 455/502 |
| 6,944,188 | B2 | * | 9/2005 | Sinha et al. | .................... 370/503 |
| 7,583,705 | B2 | * | 9/2009 | Sinha et al. | .................... 370/503 |

* cited by examiner

*Primary Examiner* — Sonny Trinh
(74) *Attorney, Agent, or Firm* — Chapin IP Law, LLC (57) ABSTRACT

A remote satellite modem, in conjunction with a mediation device configuration propagates frames over a cellular backhaul link so as to preserve PRC traceability by receiving a frame based signal, in which the frame based signal conforms to a hub timing signal operable to demarcate frames in the frame based signal, and identifies a start of frame in the received frame based signal, such that the start of frame is independent of the symbol timing of the hub timing signal. In response to the start of frame, the modem generates a timing packet corresponding to a remote timing signal, and forwards the timing packet and the frame based signal, in which the timing packet is for decoding the frame based signal corresponding to the hub timing signal using the remote timing signal.

25 Claims, 7 Drawing Sheets

TIMING RECOVERY SCHEME FOR SATELLITE BACKHAUL LINK

CLAIM TO BENEFIT OF EARLIER FILED PATENT APPLICATIONS

This invention claims the benefit under 35 U.S.C. 119(e) of the filing date and disclosure contained in Provisional Patent Application having U.S. Ser. No. 60/858,216, filed Nov. 9, 2006, entitled "TDM TIMING RECOVERY SCHEME FOR IP CELLULAR SATELLITE BACKHAUL", incorporated herein by reference.

BACKGROUND

Wireless personal communication devices such as cellphones, PDAs and similar devices are an integral part of the communications infrastructure in every industrialized country today. Increasing popularity of such devices coupled with lower cost, along with increasing service coverage areas is driving growth in more remote locales as well. Conventional cellphone technology relied on an established infrastructure providing a sufficient number of "cells", or antennas, in a particular geographic area to support the cellphone subscribers in the area. Underlying the wireless antennas providing the wireless link to the end-user devices, however, is a backbone communications network including an evolution of various technologies, such as the conventional wired public switched telephone network (PSTN), leased lines, satellite, and microwave carriers, to name several.

As cellphone popularity increases, industry growth expands into areas where economic and/or geographic restrictions had formerly presented feasibility barriers. As the subscriber base rises and device costs decrease, cellular growth emerges in remote areas where geographic separation formerly prevented expansion. In particular, satellite communications may be employed to extend the communications backbone into geographies where other infrastructure mediums (i.e. wired networks) are non-existent or unreliable. Therefore, substantial cellphone growth may be pursued in remote areas formerly devoid of a communications backbone to support wireless devices. In contrast, wireless device usage is approaching saturation in many established markets, favoring growth via enhanced services and features, rather then new device deployment.

SUMMARY

Cellular devices are becoming increasingly popular in more remote areas, due to decreasing device costs and increased service coverage areas. In remote areas, satellite linkages are providing effective alternatives to running land based wired lines through remote regions. The use of satellite intermediate networks used to backhaul transmissions in the cellular Radio Access Network (RAN) is referred to as Cellular Satellite Backhauling (CSB). In such a satellite intermediate network, bandwidth efficiency is desirable, due to the high cost of providing the satellite link. Accordingly, bandwidth optimization techniques are often employed to provide a multiplexed connection, providing packet switched point to multipoint connections across multiple remote sites (i.e. BTSs, Base Transceiver Stations). Older conventional interfaces generally provide only point to point links, in a so-called Single Channel Per Carrier (SCPC) arrangement, and may or may not be optimized.

Configurations herein are based, in part, on the observation that the intermediate satellite medium employed typically does not propagate timing information (signals) from a source hub or Base Station Controller (BSC) to the remote receivers or BTSs. The multiplexed point to multipoint connections are typically provided over an asynchronous protocol such as IP (Internet Protocol). Conventional asynchronous satellite connections such as an IP/Ethernet satellite connections suffer from the shortcoming that the asynchronous packet-based form of the IP medium nullifies the propagation of TDM (Time Division Multiplexing) symbol or bit timing. In such a conventional RAN (Radio Access Network), many intermediate devices rely on a propagated timing signal, or Primary Reference Clock (PRC) traceability throughout the transmission. Such a PRC is defined as a very highly accurate timing source according to ITU-T Recommendation G.810. In further detail, a RAN includes BTSs connected to a BSC having an interface to a GSM core for providing the cellular communications backbone. Accordingly, configurations herein substantially overcome such shortcomings of timing signal loss by identifying framing information in the received satellite signal. The satellite connections employ a frame structure such as a TDM frame, E1 frame, or other synchronous envelope to carry the IP packets. Timing information from the satellite framing transmission is employed to recreate the timing signal as a remote timing signal corresponding to the originating satellite modem on the BSC side. The timing signal lost when the frame based signal is stored in an IP form by the hub satellite modem is recreated from the TDM frame at the receiving remote satellite modem.

The intermediate satellite medium communicates via satellite modems at the BTS and BSC using a TDM frame structure. The transported IP packets are carried as payload in the TDM frames (or other frame medium depending on the vendor). The satellite modem receivers a synchronous TDM frame of a fixed length. The asynchronous IP data is carried in the TDM frame, and may be of a varying length and corresponding to various IP packets; the packet structure which nullified the original timing signal.

The RAN supporting the cellular environment, therefore, includes BTSs connected to a BSCs having an interface to a GSM core for providing the cellular communications backbone. One particular form of conventional CSB consists of backhauling GSM Abis or Ater interfaces over SCPC modem pairs connected through a "bent pipe" transponder on a geostationary orbiting satellite. Though the BSC and the remote BTSs are configured in a star configuration, the SCPC modems connect each BTS to one or more E1s at the BSC as multiple point-to-point links. The satellite modem pairs need no "knowledge" of each other. Bandwidth provisioning per link is straightforward. The satellite link simply looks like an E1 or fractional E1.

Since satellite bandwidth is extremely expensive, RAN optimizers may be used to reduce the amount of consumed satellite bandwidth with SCPC modem connections. The RAN optimizer may take the general form of a mediation device which operates TDM on one side and has IP/Ethernet on the other side. If the mediation device includes the ability to optimize backhaul traffic, it may be referred to as a RAN optimizer. While such optimization techniques improve performance in configurations herein, the disclosed recreated timing signal using the generated timing packet is applicable when an intervening medium such as IP disrupts timing synchronization. For example, a single satellite-connected BTS might have six GSM Radio Transceivers (TRXs) and consume fifteen timeslots on an E1. With a RAN optimizer, the total bandwidth might be reduced to nine timeslots. More recently, several companies have begun to promote the idea of optimized CSB by various combinations of multiplexing, compressing, and redundancy elimination. In some circles, this has been referred to as two-dimensional statistical multiplexing. In addition, proprietary techniques of statistical multiplexing through TDMA across multiple remotes are used to provide even more bandwidth savings. Usually IP is the protocol of choice for these one-to-many satellite configurations. If dimensioned correctly, RAN optimized architectures provide considerable bandwidth savings. In the example configuration that follows, such optimization is provided by a mediation device, which may or may not be used in conjunction with the recovery of the propagated timing signal.

In further detail, configurations herein perform a method for propagating a timing (clock) signal across a backhaul satellite link, effectively providing a PRC traceable clock, by identifying a data signal, in which the data signal corresponds to the timing signal, and transporting the data signal over an intermediate transport medium, in which the transport medium may not accurately reflect the timing signal. Specifically, the example arrangement propagates a timing (clock) signal from a PRC across a backhaul link and then across an asynchronous interface. The backhaul link carries asynchronous packets embedded within synchronous TDM frames, such that the asynchronous interface normally carries no timing information and thus the BTS and/or RAN optimizer equipment cannot reconstruct an accurate timing reference. The nature of the intermediate transport medium providing the backhaul link is that normal bit, symbol, and frame synchronization is therefore lost over the asynchronous packet based satellite WAN connection due to the packet nature of the backhaul link. A remote satellite modem receives the data signal via the intermediate transport medium independently of the timing signal, in which the intermediate transport medium has an identifiable frame structure such as a TDM frame. The remote satellite modem identifies a start of frame in the received data signal, and generates an alternate timing signal from the identified start of frame, such as a Network Time Protocol (NTP, as is known in the art) formatted timing packet. The satellite modem forwards the data signal and the alternate timing signal to a recipient device, such as a mediation device, in which the recipient device is responsive to the alternate timing signal for forwarding the data signal to an intended recipient.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A remote satellite modem, in conjunction with a mediation device configuration according to principles described herein, performs a method for propagating frames over the backhaul link that preserves PRC traceability by receiving a frame based signal, in which the frame based signal conforms to a hub timing signal operable to demarcate frames in the frame based signal, and identifies a start of frame in the received frame based signal. The received start of frame has an independent symbol timing synchronization from the hub timing signal, due to the intermediate transport medium (i.e. satellite). In effect, the satellite intermediary multiplexes the various data sources such that the receiving modem cannot discern the corresponding bit (symbol) interval timing to decode the incoming frame. In response to the start of frame, the modem generates a timing packet for a remote timing signal that corresponds to the hub timing signal, since it is based on the same start of frame as the hub. The modem forwards the timing packet and the frame based signal to a mediation device, in which the timing packet is for decoding the frame based signal corresponding to the hub timing signal using the remote timing signal. Thus, the timing packet reestablishes the start of frame position in the bit interval timing from a common master clock signal.

Configurations herein describe a method of imparting E1/T1 timing in a CSB application where the satellite modem link uses the Internet Protocol and the satellite modem's physical interface is Ethernet. The nature of the link is that normal E1/T1 bit and frame synchronization is completely lost over the asynchronous packet based satellite WAN connection due to the packet nature of the backhaul link. The solution employs certain synchronization functions that may be designed into or configured in cascaded components of the entire communications link, most likely in the operation provided by the remote satellite modem and the remote mediation device. Alternatively, such operation could be combined in a common device. Since the communications components of the overall link are usually provided by different sources, cooperation may be needed between these sources.

Figure 1:
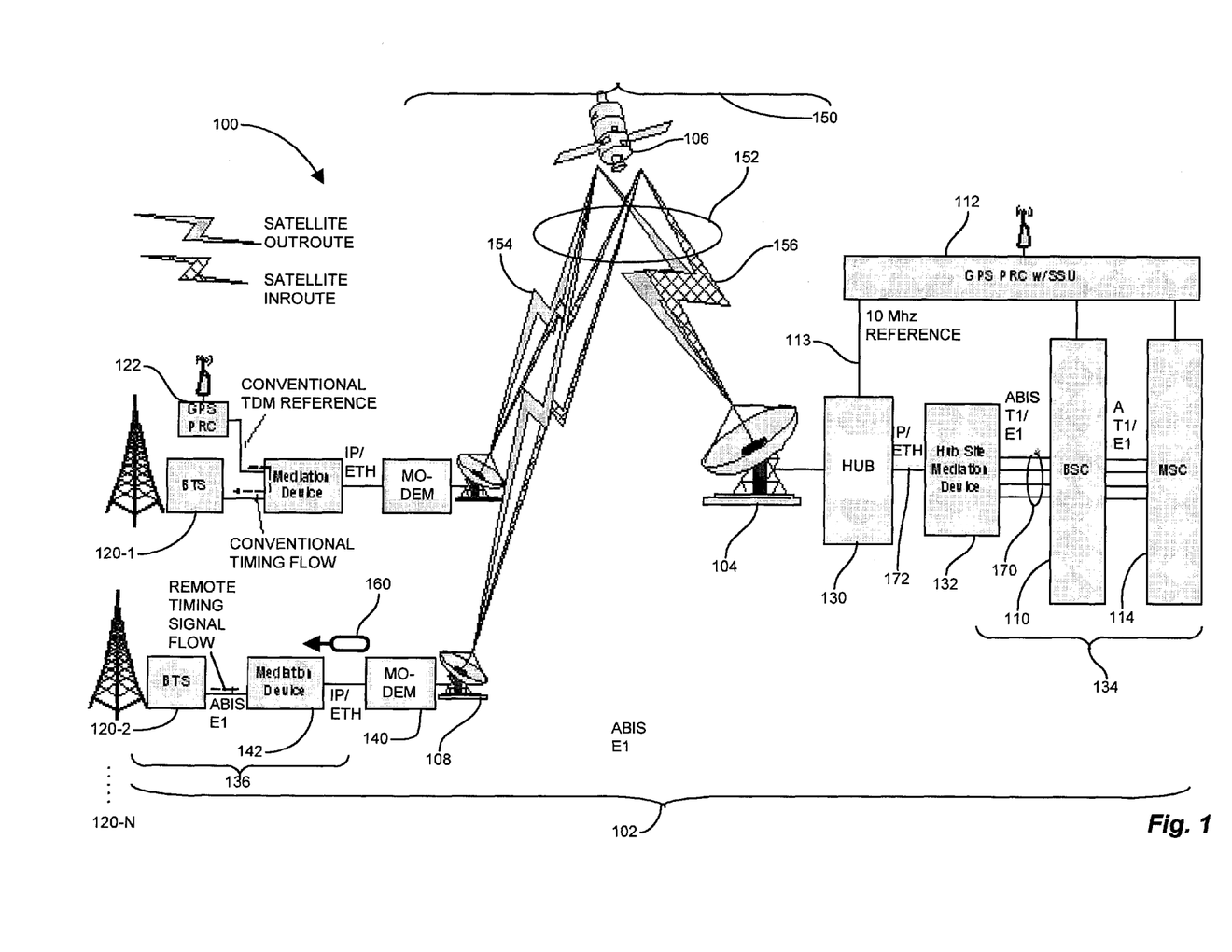
FIG. 1 is a context diagram of a communication network suitable for use with configurations of the invention.

FIG. 1 is a context diagram of a communication network suitable for use with configurations of the invention. Referring to FIG. 1, a communications environment 100 includes a base station controller 110 and a plurality of base transceiver stations 120-1 ... 120-2 (120 generally), as is known in the art of wireless networks. Each of the BSC 110 and BTS 120 has a timing source, or primary reference clock 112, 122 respectively, that in conventional synchronous arrangements is preserved throughout a communication path 102. Such a so-called PRC traceable clock, or timing signal, propagates along with the frames of the underlying signal such that conventional arrangements employ the PRC traceable clock at any point along the communication path 102. The configurations defined herein effectively replace the conventional remote clock 122 by recreating a remote timing signal 136 to emulate the timing provided by the local reference clock 112. It should be noted that the remote timing signal 136 reestablishes frame and signal synchronization based on a common master clock signal in phase synchronization throughout the environment 100, as is known in the art.

The BSC 110 interfaces with a mobile switching center (MSC) 114 and/or central office (CO) along with other infrastructure elements that define a GSM core, including a PSTN and other wired and wireless networks. In configurations herein, the BSC 110 couples to the remote BTS 120 via a hub satellite modem 130 and remote satellite modem 140 that define an intermediate transport medium 150. Conventional arrangements employ synchronous mediums to couple the BTS 120 and BSC 110 which preserve PRC traceability. The intermediate transport medium 150 employs a satellite 106 link to provide an IP (Internet Protocol) format which, although efficient for expensive satellite transport as discussed further below, nullifies PRC traceability. A hub mediation device 132 and remote mediation device 142 provide IP packet processing using mediation techniques to multiplex, aggregate and preserve bandwidth. The mediation devices 132, 142 may be, for example, the AccessGate device, marketed commercially by NMS Corporation of Framingham, Mass., and described further in U.S. Pat. No. 7,072,296, or other bandwidth optimization technique. Alternatively, other approaches may be employed such as a conversion device to simply translate between the T1/E1 and IP forms.

A frame based signal 152 may either be an outroute signal 154 from the BSC 110 to the BTS 120, or an inroute signal 156 from the BTS 120 to the BSC 110. By way of background, each BSC may support 10-50 BTSs 120, which in turn support 10-30 end-user wireless devices (i.e. cellphones, PDAs, etc.). The intermediate transport medium 150 transports the frame based signal 152 via an outroute signal 154 for establishing timing as discussed below. In the example arrangement, the modems 130 and 140 employ TDM (Time Division Multiplexed) frames that transport IP packets included in the frame based signal 152. As discussed further below, the remote modem 140 identifies a start of frame (181, FIG. 3, below) in the frame based signal 152, generates a timing packet 160 operable to establish a remote timing signal 136, and forwards the packets (182, FIG. 3) of the intermediate transport medium 150, included in an aggregate frame (180, FIG. 3), typically including multiple T1/E1 data sources 170, of the frame based signal 152 to the mediation device 142 for further propagation of the frame based signal 152 to the BTS 120.

Figure 2:
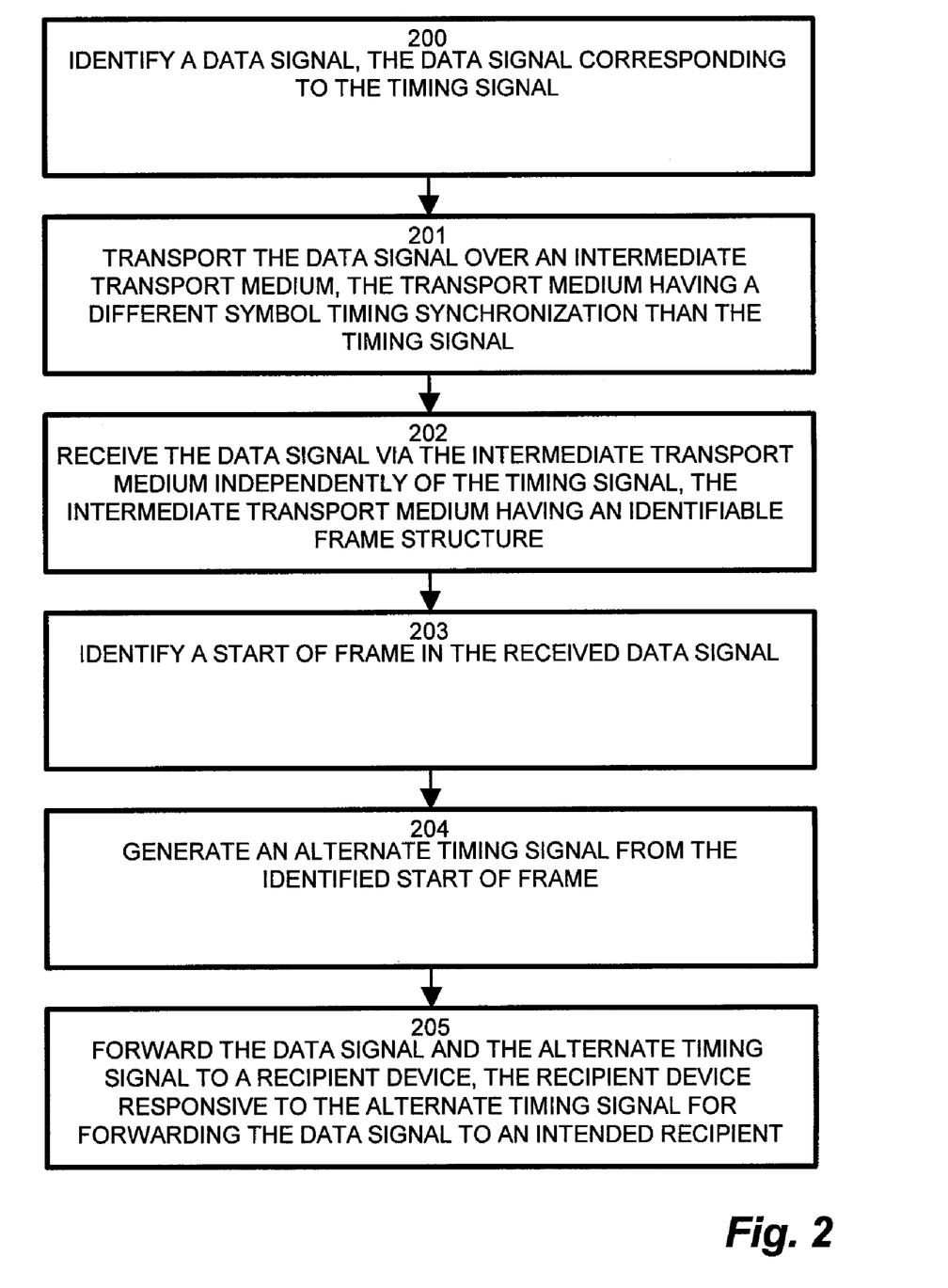
FIG. 2 is a flowchart of satellite communication in the network of FIG. 1.

FIG. 2 is a flowchart of communication in the network of FIG. 1. Referring to FIGS. 1-2, the method for propagating a clock signal via an IP satellite backhaul network includes, at step 200, identifying a data signal 152, in which the data signal corresponds to the timing signal 134 at the transmitting hub 130 for disciplining symbol timing synchronization. As discussed further below, the symbols (i.e. bits) in the data signal rely on the timing signal 134 to effectively identify (demarcate) the symbols in the data signal. The satellite 106 and modems 130, 140 transport the data signal 152 over an intermediate transport medium 150, in which the intermediate transport medium 150 has a different symbol timing synchronization than the timing signal 134 from the data sources 1700. The IP protocol transport, being an asynchronous packet transport mechanism, does not propagate the timing sequence/signal in the IP packet structure, as depicted at step 201.

The remote satellite modem 140 therefore receives the data signal 152 via the intermediate transport medium 150 independently of the timing signal 134, although the intermediate transport medium 150 has an identifiable frame structure upon which the IP packets are transported, as shown at step 202. In the example configuration 100, a TDM aggregate frame structure 180 is employed by the modems 130, 140. The remote satellite modem 140 identifies a start of frame 181 in the received data signal 152, as depicted at step 203, and generates an alternate timing signal (packet) 160 from the identified start of frame, as disclosed at step 204. The modem 140 forwards the data signal 152 and the alternate timing signal 160 to a recipient device, such as the remote mediation device 142 or directly to the BTS 120, such that the recipient device is responsive to the alternate timing signal for forwarding the data signal to an intended recipient, or end-user subscriber device (i.e. cellphone, PDA, etc.). The lack of a synchronization output on most conventional IP modems breaks the timing signal continuity, thus resulting in a need to recover the timing signal 136 at the remote end of the satellite IP link. Conventional approaches, in contrast, typically require expensive timing hardware to duplicate the timing signal lost over the satellite IP link, such as by addition of a specialized card in the modem 140 or remote mediation device 142.

Figure 3:
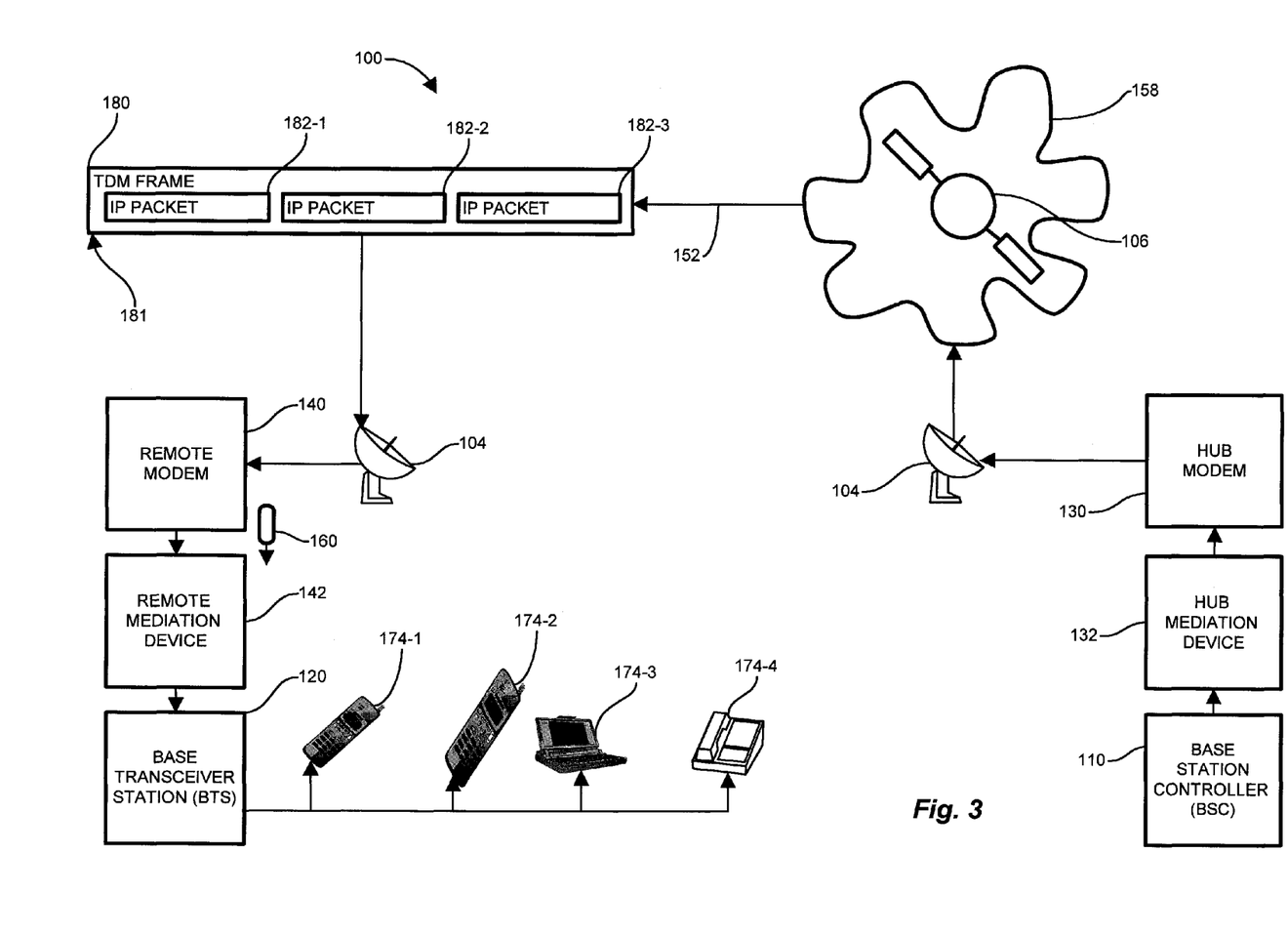
FIG. 3 is a block diagram of a configuration of timing preservation in the network of FIG. 1.

FIG. 3 is a block diagram of a configuration of timing preservation in the network of FIG. 1. Referring to FIGS. 1 and 3, in the example configuration shown, the intermediate transport medium 150 is defined by an IP satellite link 158. For the outroute 154 frame based signal 152, the mediation device 132 processes data sources of user message traffic 170 from the BSC 110. The user message traffic 170, routed from the MSC 114 and core GSM network, may emanate from a from a variety of user devices 174-1 . . . 174-N (174 generally), including but not limited to cellphones 174-1, PDAs 174-2 laptops 174-3 and conventional wired phones 174-4. The mediation device 132 outputs E1/T1 signal 172 packets in an Ethernet signal, discussed below, suitable for IP transport. The IP satellite hub 130 assembles multiple IP packets 182 from the hub mediation device 142, or devices into an aggregate TDM frame 180. The remote mediation device 142 is operable to generate a remote timing signal 136 that emulates the hub timing signal 134 for recreating the PRC traceable clock across the path 102.

The hub modem 130 multiplexes the IP/Ethernet signal from the hub mediation device 132 into the frame based signal 152 for satellite 106 transport. The modem 130 sends a modulated frame as an aggregate frame 180 typically of a fixed length (synchronous) form having packets 182-1 . . . 182-3 (182 generally) of the IP/Ethernet signal 172. Therefore, while the IP/Ethernet (satellite IP) packets 172 maintain their variable length form conforming to the asynchronous IP form, the aggregate frame 180 remains synchronous, and of either a fixed or dynamic length. The aggregate frame 180 typically includes multiplexed optimized data sources in the aggregate TDM frame 180 operable for transport via the intermediate transport medium 150, typically a satellite IP link. At the remote (BTS 120) side, the remote modem 140 receives the aggregate frame 180 and, in response, generates a timing packet 160 which the mediation device 142 employs to recreate the remote timing signal 136 emulating the hub timing signal 134. In the example shown, the timing packet 160 is an NTP packet, often employed to propagate network timing across various devices, however any suitable packet structure may be employed. Note that the hub modem 130 employs a reference signal 113 derived from the same reference clock 112 as the BSC 110 from which the user data sources 170 emanate from.

At the MSC/BSC 110 (hub) site, a Primary Reference Clocking (PRC) device is used (or assumed) to provide timing to all traditional GSM components—MSC 114 and BSC 110. This is a conventional timing setup. For the disclosed scheme to operate, we assume that the IP satellite Hub 130 has an external synchronization input 113 that is connected to the same PRC as the MSC/BSC 110, 114—not an atypical assumption for most satellite hub equipment. Typically the IP satellite Hub 130 takes a 10 Mhz sinewave on a BNC connector. The MSC/BSC 110, 114 may not be getting its PRC clocking in the same format as that of the IP satellite Hub, however it should be noted that the IP satellite Hub 130 has the same timing source as the MSC/BSC 110, 114.

With the IP satellite Hub 130 having the same timing source as the MSC/BSC 110, 114, the satellite outroute 154 aggregate TDM frame 180 will be synchronous with the MSC/BSC 110, 114. Depending on the layer 2 format used by the satellite modem vendor, the frame repetition interval could be anywhere between 40 and several hundred milliseconds. It could be argued that the remote satellite modems should produce a 10 Mhz clock that is phase locked to the 10 Mhz clock provided at the IP satellite Hub modem. This timing source could be used by the BTS 120 and the mediation device 142. Because the satellite remotes are targets for the data internet (ISP) market, these devices rarely are equipped with an output synchronization signal.

At the remote sites, the IP satellite modems 140-N, upon receipt of each outroute 154 TDM frame 180, generate an IP timing packet 160 to the remote mediation device 142. Of course, the variable latency introduced by the internal processing of the remote satellite modem should be kept to a minimum. The modem 140 itself cannot be an appreciable source of packet jitter, also known as packet delay variation (PDV). The timing recovery algorithm in the mediation device 142 then uses jitter-free (low PDV) timing packets to drive its PLL to produce an Abis TDM link to the BTS 120. The BTS 120 is configured to derive its TDM timing from the T1/E1—the usual source of its timing. It will be apparent to those of skill in the art that the more packet bandwidth (frequency of packets) devoted to the timing packets, the better the timing recovery can be.

Figure 4:
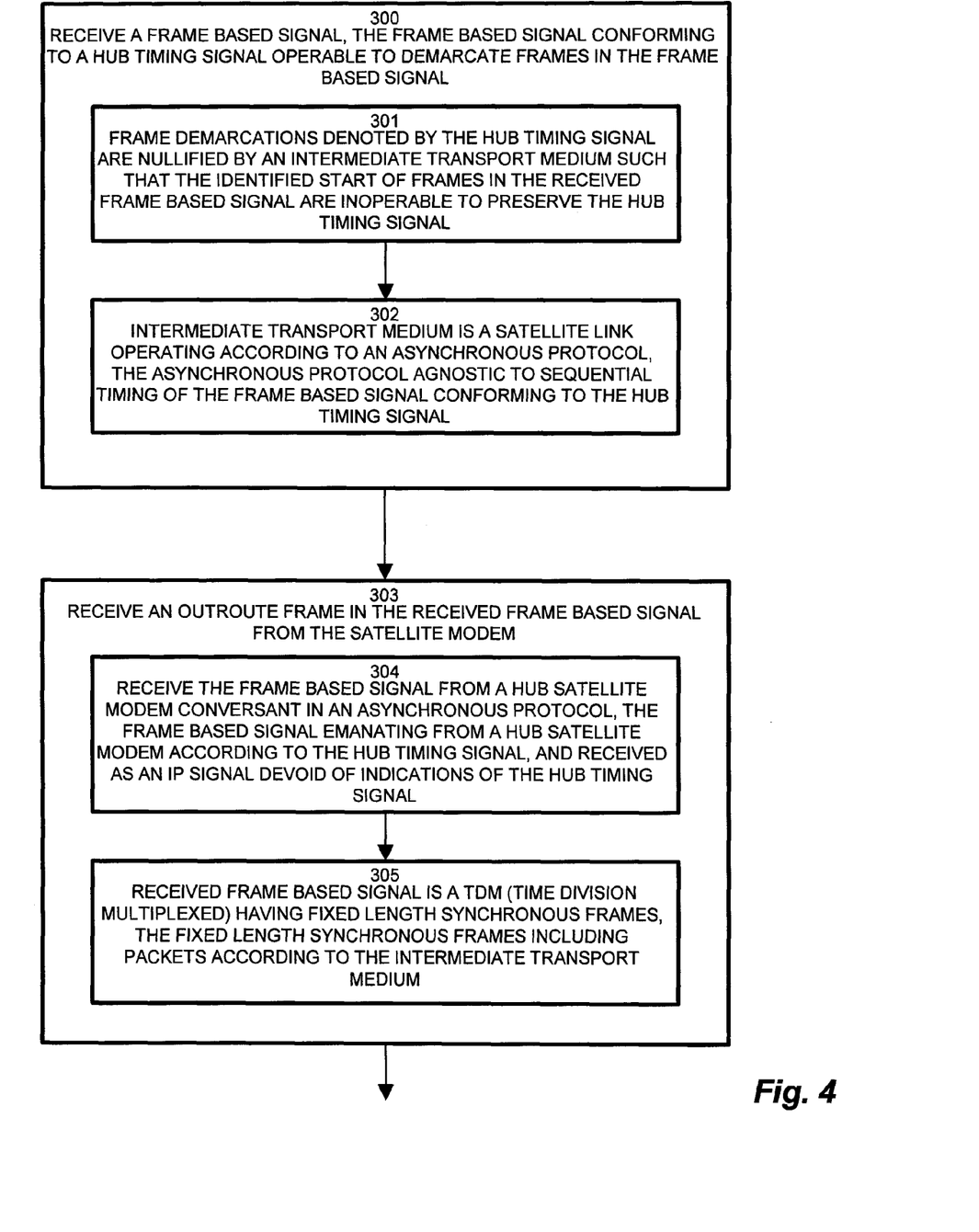
FIGS. 4-6 are a flowchart of communications according to the configuration of FIG. 3.
Figure 5:
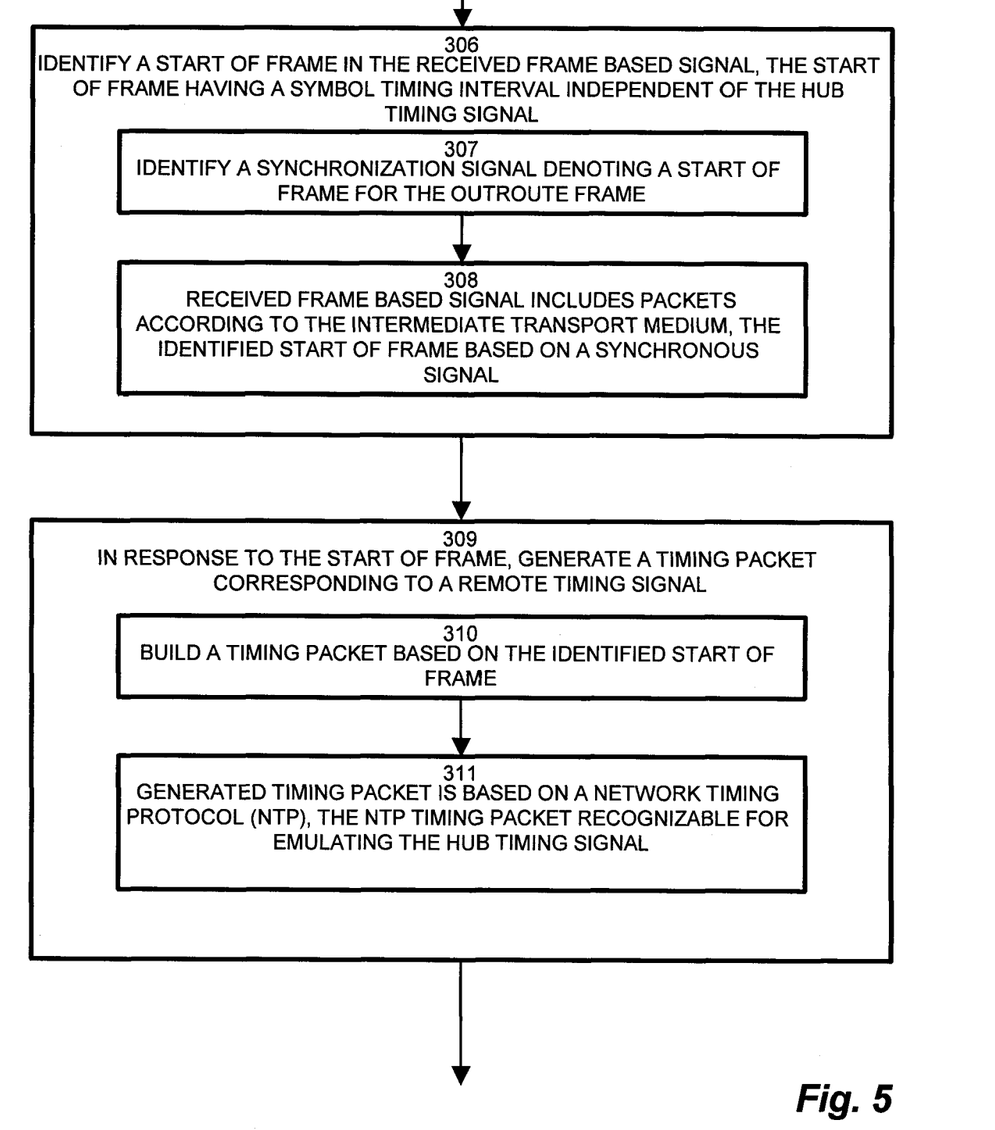
Figure 6:
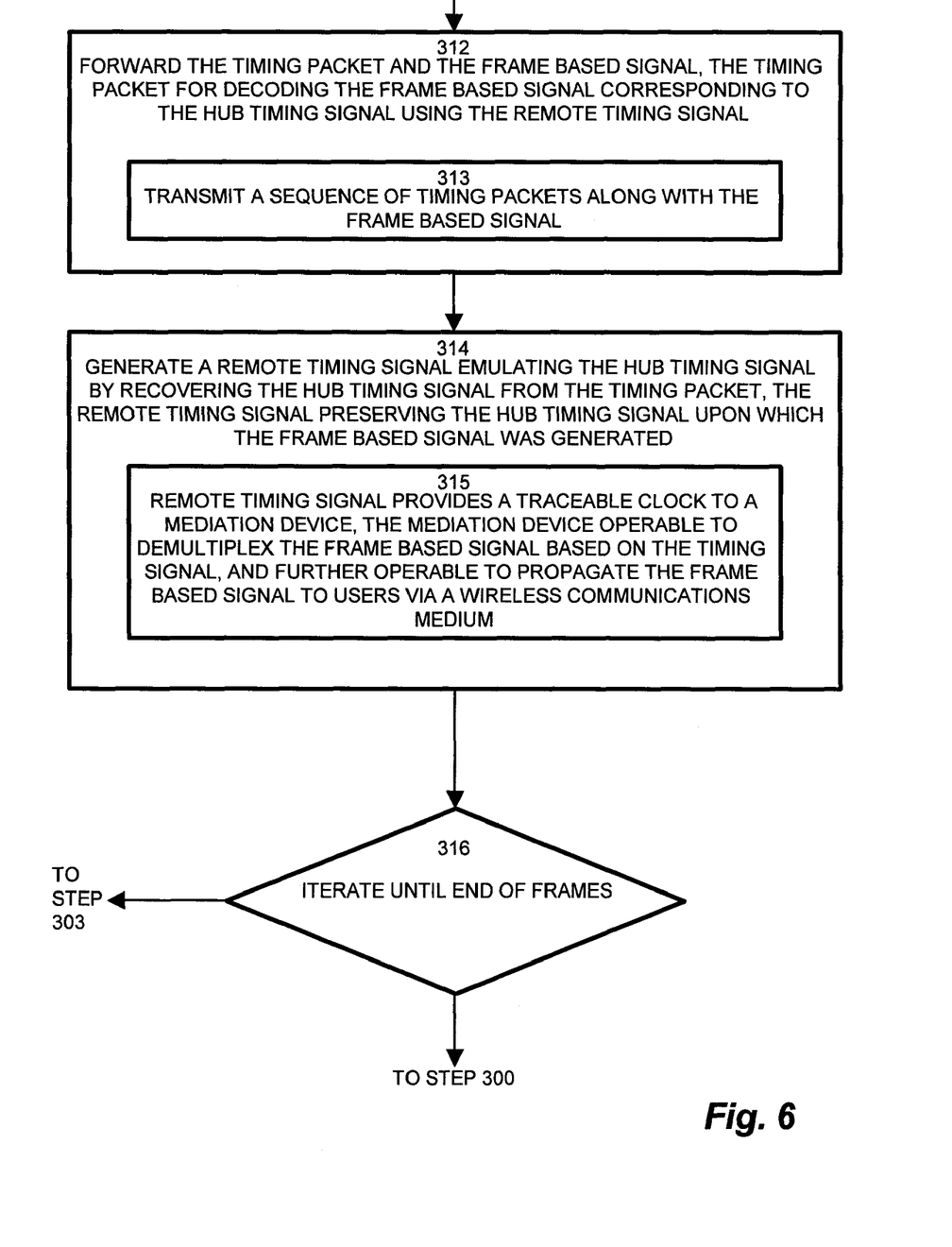

FIGS. 4-6 are a flowchart of communications according to the configuration of FIG. 3. Referring to FIGS. 1 and 3-6, the method for propagating frames 180 in the example environment 100 of FIG. 3 includes receiving a frame based signal 152, such that the frame based signal 152 conforms to a hub timing signal 134 operable to demarcate frames (i.e. identify frame boundaries via a start of frame) in the frame based signal 152, as depicted at step 300. The frame demarcations denoted by the hub timing signal 134 are reorganized by the intermediate transport medium 150, satellite IP in the example shown, such that the identified start of frames 181 in the received frame based signal 152 are inoperable to preserve the hub timing signal 134, as disclosed at step 301. In other words, the IP encoding performed on the frame based signal 152 by the satellite IP network 158 destroys the frame timing existing at the hub modem 130, such that the received packets 182 no longer exhibit a correlation or relevance to the hub timing signal 134 from which they were encoded. In the example shown, the intermediate transport medium 150 is a satellite link 106 operating according to an asynchronous protocol, the asynchronous protocol agnostic to sequential timing of the frame based signal conforming to the hub timing signal 134, as depicted at step 302. Although the aggregate TDM frame 180 carrying the packets 182 has an identifiable structure, this does not necessarily line up with the frame structure and timing from the sending hub modem 130. In the example shown, the satellite link 106 is provided by a satellite IP network 158 carried by satellite modems on the hub 130 and remote 140 sides.

The remote side of the path 102 receives an outroute 154 frame 180 in the received frame based signal 152 from the hub modem 130, as depicted at step 303. In the example shown, the remote modem 140 receives the frame based signal 152 from a hub satellite modem 130 conversant in an asynchronous protocol, such that the frame based signal 152 emanates from the hub satellite modem 130 according to the hub timing signal 134, but is received as an IP signal devoid of indications of the hub timing signal 134, as shown at step 304. The received frame based signal 152 is a TDM (time division multiplexed) signal having fixed or variable length synchronous frames 180, such that the synchronous frames 180 include packets 182 according to the intermediate transport medium 150, as depicted at step 305. Alternate configurations may employ other satellite mediums having a suitable start of frame 181 indication.

The remote modem 140 identifies the start of frame 181 in the aggregate frame 180 of the received frame based signal 152, such that the start of frame 181 has a symbol interval timing independent of a symbol interval timing of the hub timing signal 134, as disclosed at step 306. It should be noted that the received aggregate TDM frame 180 structure is distinctly different from the framing structure upon which the hub timing signal is based, and that even if the frames are the same size (duration), synchronicity is lost in the intervening satellite IP 158 transmission. The receiving remote modem 140 identifies a synchronization signal denoting the start of frame 181 for the outroute frame, as disclosed at step 307. In the example TDM configuration, the sync signal is identifiable via a phase lock loop (PLL) or other suitable mechanism as is known in the art. As indicated above, the received frame based signal 152 includes packets 182 according to the intermediate transport medium 150, in which the identified start of frame 181 is based on a synchronous signal inherent in the aggregate frame 180, as depicted at step 308.

The remote modem 140, in response to the start of frame 181, generates a timing packet 160 corresponding to the remote timing signal 136, as shown at step 309. The remote modem 140 builds the timing packet based 160 on the identified start of frame 181, depicted at step 310, such that downstream devices (i.e. mediation device 142 and/or BTS 142) are responsive to the timing packet 160 for recreating the synchronous remote timing signal 136 emulating the hub timing signal 134, and allowing receipt of the frame based signal 152, and subsequent decoding of the data sources 170, based upon the hub timing signal 134. In the example arrangement, the generated timing packet 160 is based on the network timing protocol (NTP), such that the NTP timing packet 160 is recognizable for emulating the hub timing signal, as disclosed at step 311.

The remote modem 140 forwards the timing packet 160 and the frame based signal 152 to the mediation device 142, such that the timing packet 160 provides timing for decoding the frame based signal 152 corresponding to the hub timing signal 134 using the remote timing signal 136, as depicted at step 312. The timing packet 160 may be regenerated with each successive frame 180, if needed, or at successive intervals or transmissions of the frame based signal 152. Accordingly, the remote modem 140 transmits a sequence of timing packets 160 along with the frame based signal 152 to maintain accurate timing as a PRC traceable clock, as disclosed at step 313.

The remote mediation device 142 generates the remote timing signal 136 emulating the hub timing signal 134 by recovering the hub timing signal 134 from the timing packet 160, in which the remote timing signal 136 preserves the hub timing signal 134 upon which the frame based signal 152 was generated, as disclosed at step 314. Further, as the TDM frame 180 has a known length, the timing packet 160 may include the length to allow successive TDM intervals to be ascertained, or the synchronous period may be predetermined by other mechanisms or values. In this manner, the remote timing signal (packet) 160 provides a PRC traceable clock to the mediation device 142, in which the mediation device 142 is operable to demultiplex the frame based signal 152 based on the timing signal 136, and is further operable to propagate the frame based signal 152 to users 174-N via a wireless communications medium, as depicted at step 315. Timing packet 160 recreation occurs upon successive frames 180 until the end of the transmission, as shown at step 316.

Successive timing packets may be generated upon receipt of successive frames 180, depending on the accuracy desired. In this manner, the generated remote timing packet 160 provides a PRC traceable clock from a GSM core network including the hub modem 130 employing the hub timing signal 134 and a remote modem 140 employing the remote timing signal 136, such that the hub timing signal 134 and the remote timing signal 136 collectively provide a traceable PRC for bi-directional communications.

Figure 7:
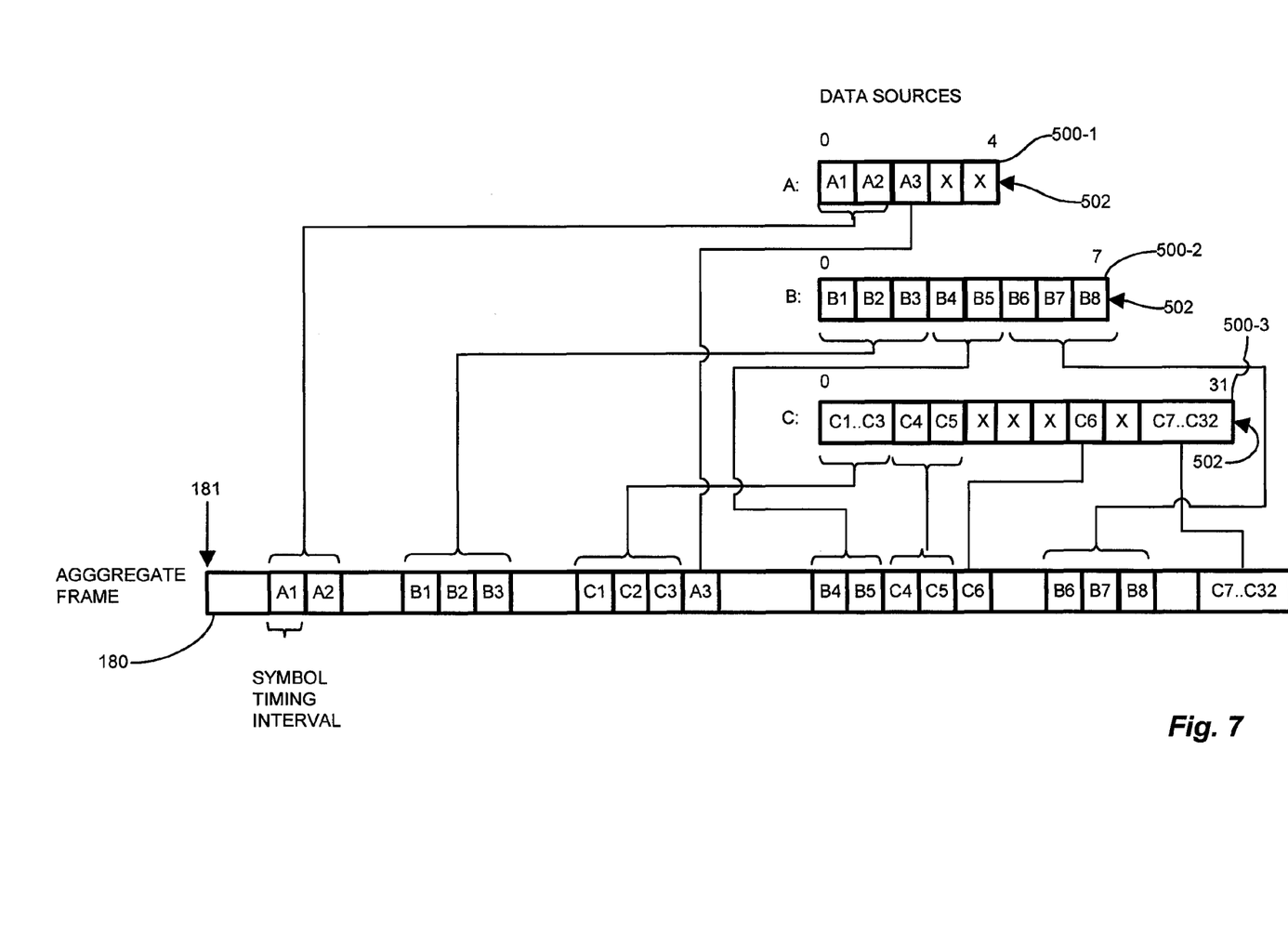
FIG. 7 shows an aggregate frame resulting in a loss of the symbol timing interval of FIG. 4.

FIG. 7 shows an aggregate frame resulting in a loss of the symbol timing interval of FIG. 3. Referring to FIGS. 7 and 3, an example of framing employed over the intermediate transport medium, or satellite IP link in the example environment of FIG. 3 is shown. The hub mediation device 132 coalesces data from a plurality of data sources 170, shown as A, B and C 500-1 . . . 500-3 (500 generally), respectively, multiplexes the sources 500 (generally) into the aggregate TDM frame 180 for satellite 106 transport (a satellite IP TDM frame, in the example arrangement), and transmits to multiple remote modems 140 in a point to multipoint arrangement. The remote mediation devices 142 receive the aggregate frame 180, identify the start of frame 181 and send the timing packet 160 to recover the timing as the remote timing signal, and demultiplex the aggregate frame 180 back into the corresponding sources A, B and C 500. Each of the respective mediation devices 142 and other mediation devices 142-N at similar remote sites, responsive to the NTP timing packet 160, recovers the respective data sources 500 using the remote timing signal 136, which now corresponds to the hub timing signal 134 from which the data sources 500 were framed.

In FIGS. 3 and 7, the intermediate transport medium 150 (satellite 106 in the example shown) receives data from multiple sources A, B, C 500 as the frame based signal 152. The mediation device 132 both produces the TDM framing of the aggregate frame 180 and also optimizes the transmission, effectively removing certain symbols (bits) through optimization mechanisms. In data source A 500-1, symbols (bits) 4 and 5 are optimized, as are bits 6-8 and 10 of data source C 500-3. It should be noted, however, that the simplest case may not "optimize away" any symbols, for example if the mediation device is merely a pseudowire translating between the E1/T1 framing and the satellite IP TDM framing. Further, note that the received data source 500 packets need not be the same size, nor does the aggregate frame 180 need to be a fixed size. However, resulting timing packet 160 should include the timing interval if it is not predetermined to a fixed length/interval by the system. Thus, the resulting satellite TDM framing from the hub mediation device 132 is an aggregate frame 180 multiplexed from multiple data sources 500.

The data sources 500 contain discrete symbols 502 A1, B1, C32, etc., typically binary bits, however other symbol representations may be employed. As is known in network transmission protocols, symbols (i.e. bits) are transmitted according to a packet and frame structure based on a predetermined or known symbol rate. During optimization by the hub mediation device 132, however, the symbols from various sources become interleaved in the framing 180 of the intermediate transport medium 150. In the example arrangement, the intermediate transport medium 150 is a satellite TDM framing 180 including IP packets 182, however alternate arrangements may be employed. In the example arrangement, the mediation device transforms 132 the incoming data sources 500 in an E1/T1 format to an IP form.

Symbol timing is derived form a master clock common to each device, however the intermediate transport medium 150 does not preserve the symbol timing of the E1/T1 data source. However, the intermediate transport medium 150 is phase locked to the master clock, as are all devices in the environment 100. This enables the remote mediation device 142, upon receiving the timing packet 160 denoting the start of frame 180, to compute the remote timing signal 136 and identify and decode the successive symbols 502 based on the phase lock to the master clock.

Therefore, in one sense it could be said that the remote timing is independent from the hub timing, however the recreated remote timing is such that it emulates the hub timing so that the received TDM frames (aggregate frames) 180 may be decoded per their respective sources. It follows, therefore, that while the conventional PRC traceability does not propagate over the intermediate satellite transport medium 150 due to the satellite IP TDM framing 180, the recreated remote timing 136 derived from the timing packet 160 based on the start of frame 181 from the received aggregate frame 180 effectively recreates the remote timing because the remote modem 140 remains phase locked with the hub modem 130, i.e. based on the same master clock.

The received aggregate frame 180 does not represent the symbol timing of the data sources. The remote timing signal 136 therefore recovers symbol timing by identifying, via a start of frame 181 disciplined by the intermediate transport medium 150 (i.e. satellite IP) framing, thus maintaining a symbol timing synchronization (i.e. master clock timing) across the hub and remote while having a symbol interval timing independent of a symbol interval timing of the hub timing signal 134. When the aggregate frame 180 is received, the NTP timing packet 160 denoting the start of frame recovers the symbol timing lost via the TDM framing 180 in the IP satellite link 158.

In a particular configuration of the timing recovery scheme, existing IETF standards may be employed. This applies to both the format and protocols of the jitter-free timing packet. Alternatively, SNTP (Simple Network Time Protocol) may be employed for the timing packet 160. SNTP uses the same basic structure as NTP for the packet format, but many of the fields may not be used. The NTP timestamp contained in the (S)NTP packet consist of 64 total bits. The most significant 32 are the integer number of seconds from 0 hours, Jan. 1, 1900. The least significant 32 bits are fractional seconds. The temporal precision of the NTP timestamp is 1×2*10E32 or 232 picoseconds. This numeric precision certainly exceeds the requirements for temporal resolution needed for the application. The use of absolute time is, of course, not necessary. By using the NTP timestamps in the NTP packet, the mediation device 142 has all the information it needs to run its PLL to produce PDH timing. Since the mediation device 142 is assumed to be on the same subnet as the remote satellite modem, the remote satellite modem 140 can use IP broadcast for its destination address; another reduction in user configured information. The (S)NTP well known UDP port, 123, could also be used.

In particular, configurations may employ the NTP protocol for the timing packet 160. The NTP protocol itself has several different modes. The mode that appears to apply to configurations herein is a broadcast mode. In broadcast mode, a server on the same subnet as the client(s) periodically broadcasts an SNTP formatted packet. Version 4 of (S)NTP allows for the client (the mediation device in our case) to have an initial association/dialog as a NTP client to obtain rapid time alignment; but we do not require this burst dialog as the anticipated broadcasts from the IP satellite modem 140 will typically have a period less than 300 msecs. Therefore, broadcast mode for our application will consist of simplex periodic NTP-formatted IP packet transmissions from the remote satellite modem 140 to the mediation device 142 on the local subnet.

Version 4 of NTP/SNTP also allows for authentication of NTP packets. The network should be considered physically secure. The source address of the SNTP IP packet would be the IP address of the local time server—the remote IP satellite modem. In our case, this would be the IP address of the remote IP satellite modem router. The destination SNTP IP address would be the local subnet classless broadcast address. We assume that there is one small subnet at each of the remotes with a two or three bit subnet. The source and destination UDP port would be 123 as specified for (S)NTP. Since the broadcast address would be for the local subnet only, the SNTP packet would stay on the local subnet.

Those skilled in the art should readily appreciate that the programs and methods for cellular satellite backhaul as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media. Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below.

One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

While the system and method for cellular satellite backhaul has been particularly shown and described with references to embodiments thereof, it will be understood by those skilled in the art that various changes in form and details may be made therein without departing from the scope of the invention encompassed by the appended claims.

What is claimed is:

1. A method for propagating frames comprising:
   receiving a frame based signal, the frame based signal conforming to a hub timing signal operable to demarcate frames in the frame based signal;
   identifying a start of frame in the received frame based signal, the start of frame having a symbol interval timing independent of a symbol interval timing of the hub timing signal;
   in response to the start of frame, generating a timing packet corresponding to a remote timing signal; and
   forwarding the timing packet and the frame based signal, the timing packet for decoding the frame based signal corresponding to the hub timing signal using the remote timing signal.

2. The method of claim 1 wherein the frame demarcations denoted by the hub timing signal are nullified by an intermediate transport medium such that the identified start of frames in the received frame based signal are ineffective to preserve the hub timing signal to accurately represent the symbol interval timing of the frame based signal.

3. The method of claim 2 wherein the received frame based signal includes packets according to the intermediate transport medium, the identified start of frame based on a synchronous signal, further comprising recovering the symbol timing interval for identifying the start of frame from the timing packet.

4. The method of claim 3 wherein the intermediate transport medium is a satellite link operating according to an asynchronous protocol, the asynchronous protocol agnostic to sequential timing of the frame based signal conforming to the hub timing signal.

5. The method of claim 4 wherein the generated timing packet is based on a network timing protocol (NTP), the NTP timing packet recognizable for emulating the hub timing signal for identifying the symbol timing interval.

6. The method of claim 5 wherein the received frame based signal is a TDM (time division multiplexed) signal having fixed length synchronous frames, the fixed length synchronous frames including packets according to the intermediate transport medium.

7. The method of claim 3 further comprising receiving the frame based signal from a hub satellite modem conversant in an asynchronous protocol, the frame based signal emanating from a hub satellite modem according to the hub timing signal, and received as an IP signal devoid of indications of the hub timing signal.

8. The method of claim 1 further comprising:
   receiving an outroute frame in the received frame based signal from the satellite modem;
   identifying a synchronization signal denoting a start of frame for the outroute frame;
   building a timing packet based on the identified start of frame;
   transmitting a sequence of timing packets along with the frame based signal; and
   generating a remote timing signal emulating the hub timing signal by recovering the hub timing signal from the timing packet, the remote timing signal preserving the hub timing signal upon which the frame based signal was generated.

9. The method of claim 8 wherein the remote timing signal provides a traceable clock to a mediation device, the mediation device operable to demultiplex the frame based signal based on the timing signal, and further operable to propagate the frame based signal to users via a wireless communications medium.

10. The method of claim 9 wherein the mediation device has a first interface connected to the satellite modem and a second interface connected to a wireless transceiver, further comprising:
    receiving the start of frame from the frame based signal;

recreating the frame based signal using the generated remote timing signal; and forwarding the frame based signal using the remote timing signal, the remote timing signal preserving the frame structure of the frame based signal.

11. The method of claim 1 wherein the generated remote timing packet provides a PRC traceable clock from a GSM core network including a hub modem employing the hub timing signal and a remote modem employing the remote timing signal, the hub timing signal and the remote timing signal collectively providing a traceable PRC for bi-directional communications.

12. A system for propagating a timing signal comprising:
identifying a data signal, the data signal corresponding to the timing signal for disciplining symbol timing synchronization;
transporting the data signal over an intermediate transport medium, the intermediate transport medium having a different symbol timing synchronization than the timing signal;
receiving the data signal via the intermediate transport medium independently of the timing signal, the intermediate transport medium having an identifiable frame structure;
identifying a start of frame in the received data signal;
generating an alternate timing signal from the identified start of frame; and
forwarding the data signal and the alternate timing signal to a recipient device, the recipient device responsive to the alternate timing signal for forwarding the data signal to an intended recipient.

13. The system of claim 12 wherein the transport medium is an IP satellite link supporting an IP protocol, the IP protocol agnostic to the timing signal, further comprising:
receiving, at a satellite modem, an aggregate frame via the IP satellite link;
upon receipt of the aggregate frame, generating an NTP packet corresponding to the timing signal; and
recovering, responsive to the generated NTP packet, a remote timing signal emulating the timing signal and operable to transport a data signal originated based on the timing signal to a recipient employing the remote timing signal, the remote timing signal and timing signal phase locked to a common master clock.

14. A computer program product having a computer readable medium operable to store a set of encoded instructions which, when executed by a processor responsive to the instructions, cause a computer connected to the computer readable medium to perform signal timing propagation, comprising:
computer program code for receiving a frame based signal, the frame based signal conforming to a hub symbol timing interval signal operable to demarcate symbols in the frame based signal, the symbol demarcations denoted by the hub symbol timing interval signal being nullified by an intermediate transport medium such that the identified start of frames in the received frame based signal are ineffective to preserve the hub symbol timing interval signal;
computer program code for identifying a start of frame in the received frame based signal, the start of frame having a symbol timing interval independent of the hub symbol timing interval signal, the received frame based signal including packets according to the intermediate transport medium, the identified start of frame based on a synchronous signal in phase with the hub timing signal;
computer program code for, in response to the start of frame, generating a timing packet corresponding to a remote timing signal; and
computer program code for forwarding the timing packet and the frame based signal, the timing packet for decoding the frame based signal corresponding to the hub symbol timing interval signal using the remote timing signal.

15. The computer program product of claim 14 further comprising computer program code for receiving the frame based signal from a hub satellite modem conversant in an asynchronous protocol, the frame based signal emanating from a hub satellite modem according to the hub timing signal, and received as an IP signal devoid of indications of symbol timing of the hub timing signal.

16. The computer program product of claim 14 wherein the generated timing packet is based on a network timing protocol (NTP), further comprising computer program code for recognizing the NTP timing packet for emulating the hub timing signal, the generated timing packet including a timing interval of the received frame.

17. The computer program product of claim 14 wherein the received frame based signal is a TDM (time division multiplexed) signal having fixed length synchronous frames, the fixed length synchronous frames including packets according to the intermediate transport medium.

18. The computer program product of claim 14 further comprising:
computer program code for receiving an outroute frame in the received frame based signal from the satellite modem;
computer program code for identifying a synchronization signal denoting a start of frame for the outroute frame;
computer program code for building a timing packet based on the identified start of frame;
computer program code for transmitting a sequence of timing packets along with the frame based signal;
computer program code for generating a remote timing signal emulating the hub timing signal by recovering the hub timing signal from the timing packet, the remote timing signal preserving the hub timing signal upon which the frame based signal was generated.

19. The computer program product of claim 14 further comprising computer program code for providing a traceable clock to a mediation device, further comprising computer program code for:
demultiplexing the frame based signal based on the timing signal, and
propagating the frame based signal to users via a wireless communications medium.

20. The computer program product of claim 19 further comprising:
computer program code for receiving the start of frame from the frame based signal;
computer program code for recreating the frame based signal using the generated remote timing signal; and
computer program code for forwarding the frame based signal using the remote timing signal, the remote timing signal preserving the frame structure of the frame based signal.

21. In a communications network having a master clock defining a timing reference, the timing reference synchronizing symbol timing for data signals in the communications network, a method for preserving signal timing between a data source and a data destination comprising:
generating an aggregate frame from at least one of the data sources, the data sources based on a synchronous medium having a timing signal, the aggregate frame based on a different symbol timing synchronization than the data sources;

transporting the aggregate frame over an intermediate transport medium operable for transport according to the different symbol timing synchronization such that a frame timing of the aggregate frame does not represent the symbol timing synchronization of the data sources, the intermediate transport medium having a different symbol timing synchronization than the data source and data destination;

receiving the aggregate frame operable to include a plurality of the data sources; and recovering the timing signal of the data sources by:
identifying a start of frame of the received aggregate frame;
generating a timing packet in response to the received start of frame; and
decoding the received aggregate frame based on the generated timing packet, the timing packet operable to emulate the timing signal of the data sources, the decoded frame yielding the data sources from which the aggregate frame was generated.

22. The method of claim 21 wherein the aggregate frame is a TDM frame transported according to a satellite IP protocol, the data sources defined by IP packets in the aggregate frame.

23. The method of claim 21 wherein the data sources are E1/T1 signals from a base station controller.

24. The method of claim 21 wherein the timing packet is an NTP packet operable to synchronize a mediation device demultiplexing the aggregate frame, the mediation device receiving the generated timing packet.

25. The method of claim 21 wherein the data source and aggregate frame are phase locked to the same master clock via the timing reference.

* * * * *